United States Patent
Toniolo et al.

(10) Patent No.: US 12,037,896 B2
(45) Date of Patent: Jul. 16, 2024

(54) CONVEYANCE APPARATUS, SYSTEMS, AND METHODS

(71) Applicant: Schlumberger Technology Corporation, Sugar Land, TX (US)

(72) Inventors: Julien Toniolo, Houston, TX (US); Dustin Cavin, Katy, TX (US); Firas Al Shaikh Hasan, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 111 days.

(21) Appl. No.: 17/753,099

(22) PCT Filed: Aug. 19, 2020

(86) PCT No.: PCT/US2020/070431
§ 371 (c)(1),
(2) Date: Feb. 18, 2022

(87) PCT Pub. No.: WO2021/035255
PCT Pub. Date: Feb. 25, 2021

(65) Prior Publication Data
US 2022/0275722 A1    Sep. 1, 2022

Related U.S. Application Data

(60) Provisional application No. 62/888,798, filed on Aug. 19, 2019.

(51) Int. Cl.
*E21B 47/12* (2012.01)
*E21B 23/04* (2006.01)

(52) U.S. Cl.
CPC .............. *E21B 47/12* (2013.01); *E21B 23/04* (2013.01)

(58) Field of Classification Search
CPC ................................. E21B 47/12; E21B 23/04
See application file for complete search history.

(56) References Cited

U.S. PATENT DOCUMENTS

| | | | | |
|---|---|---|---|---|
| 4,760,252 A | * | 7/1988 | Albats | G01V 5/107 250/269.4 |
| 5,868,210 A | * | 2/1999 | Johnson | E21B 41/02 166/50 |
| 6,188,222 B1 | * | 2/2001 | Seydoux | E21B 47/13 175/50 |
| 7,500,388 B2 | | 3/2009 | Fujisawa et al. | |
| 7,891,424 B2 | | 2/2011 | Creel et al. | |

(Continued)

FOREIGN PATENT DOCUMENTS

CA    2450391 C    10/2007

OTHER PUBLICATIONS

International Search Report and Written Opinion issued in the PCT Application PCT/US2020/070431, dated Dec. 1, 2020 (12 pages).

(Continued)

*Primary Examiner* — Crystal J Lee
(74) *Attorney, Agent, or Firm* — Jeffrey D. Frantz

(57) ABSTRACT

A method of obtain formation evaluation data that includes deploying an evaluation tool string into a drill string located in a wellbore. The method can also include landing the evaluation tool string in a portion of the drill string that is configured to optimize formation evaluation using the evaluation tool located therein.

20 Claims, 3 Drawing Sheets

(56) References Cited

U.S. PATENT DOCUMENTS

| | | | |
|---|---|---|---|
| 9,249,658 B2 | 2/2016 | Macrae | |
| 2006/0213662 A1* | 9/2006 | Creel | E21B 27/02 |
| | | | 166/292 |
| 2016/0003028 A1 | 1/2016 | Aklestad et al. | |
| 2016/0186556 A1* | 6/2016 | Rasmus | G06F 17/11 |
| | | | 703/2 |
| 2016/0215612 A1* | 7/2016 | Morrow | E21B 47/16 |
| 2016/0215613 A1 | 7/2016 | Wilson et al. | |
| 2019/0203588 A1* | 7/2019 | Popp | E21B 44/00 |

OTHER PUBLICATIONS

International Preliminary Report on Patentability issued in the PCT Application PCT/US2020/070431 dated Mar. 3, 2022, 9 pages.
Extended Search Report issued in European Patent Application No. 20855087.1 dated Jul. 5, 2023, 6 pages.
Substantive Exam issued in Saudi Arabia Patent Application No. 522431696 dated Nov. 13, 2023, 12 pages with English translation.

* cited by examiner

CONVEYANCE APPARATUS, SYSTEMS, AND METHODS

CROSS-REFERENCE TO RELATED APPLICATION

This application is a National Stage Entry of International Patent Application No. PCT/US2020/070431, filed on Aug. 19, 2020, which claims priority to U.S. Provisional Application No. 62/888,798, filed on Aug. 19, 2019, which is incorporated herein by reference in its entirety.

BACKGROUND

This disclosure generally relates to methods of obtaining formation evaluation data using an evaluation tool string that is located within a drill string in a wellbore. Traditional formation evaluation operations are performed after the drill string is tripped out of the wellbore, which increases the time of the operation. In addition, when formation evaluation tool strings are deployed into a wellbore using traditional methods, the tool strings are at risk of getting stuck or lost in hole.

Therefore, a need exists for apparatus, systems, and methods to obtain formation evaluation data in an efficient manner that also reduces the risk of losing the formation evaluation toolstring in the hole.

SUMMARY

A method of obtaining formation evaluation data that includes deploying an evaluation tool string into a drill string located in a wellbore. The method can also include landing the evaluation tool string in a portion of the drill string that is configured to optimize formation evaluation using the evaluation tool located therein. The method can also include operating the evaluation tool string to obtain formation evaluation data as the drill string is tripped out of hole. The method can also include acquiring operation data during conveyance, after landing, and during operation of the evaluation tool; and sending acquired evaluation data and acquired operation data to the surface using a communication system on the evaluation tool string as the drill string is tripped out of hole.

A method of tethered deployment of a tool string in a drill string can include landing the tool string in a set of tubulars optimized for drilling and through logging; wherein the tool string has a communication system to the surface, for communication after disconnection.

A method of untethered deployment of a tool string in a drill string can include landing the tool string in a set of tubulars optimized for drilling and through logging, wherein the tool string comprises a communication system to the surface.

A BRIEF DESCRIPTION OF THE DRAWINGS

Various aspects of this disclosure may be better understood upon reading the following detailed description and upon reference to the drawings in which.

DETAILED DESCRIPTION

Figure 1:
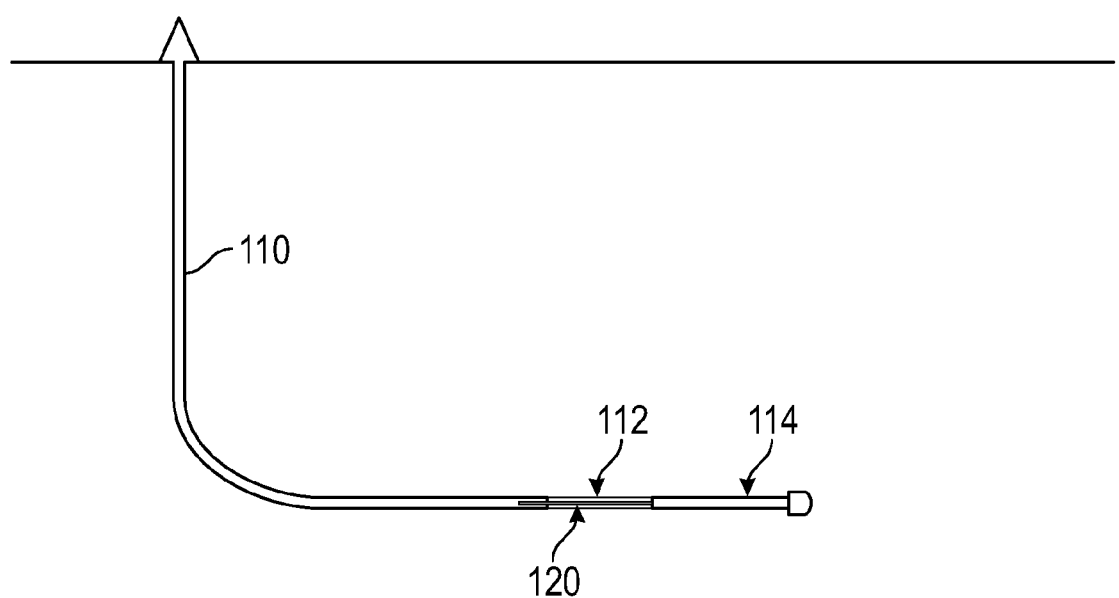
FIG. 1 depicts a schematic of a system for logging after drilling.

One or more specific embodiments of the present disclosure will be described below. These described embodiments are examples of the presently disclosed techniques. Additionally, in an effort to provide a concise description of these embodiments, features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

A method of obtaining formation evaluation data can include deploying an evaluation tool string into a drill string located in a wellbore. The drill string is optimized for drilling a well and performing related operations, such as drilling, reaming, circulating, and the like. The drill string at time of drilling has one or more portions thereof that is optimized for tube logging and data acquisitions. Accordingly, the drill string having the one or more portions optimized for through tube logging reduces the overall time to complete both the drilling plan and the logging plan.

The evaluation tool string can be conveyed by pumping the evaluation tool string into the drill string without the evaluation tool string being connected with surface equipment. In another embodiment, the evaluation tool string can be deployed with a wireline, slickline, cable, or the like connected with the evaluation tool string. In one or more embodiments, the tether can be released prior to tipping the drill string out of the wellbore.

The method can also include landing the evaluation tool string in a portion of the drill string that is configured to optimize formation evaluation using the evaluation tool located therein. Configured to optimize formation evaluation as used herein can mean that material properties in the section of the drill string are such that the formation evaluation tool adjacent to that portion will have performance substantially equal to performance of the same type of formation evaluation tool used outside of the drill string. Equal performance can be achieved by adjusting dimensions and material properties of the portions of the drill string adjacent to the tool. Even if the drill string bias the measurement, the bias can be characterized and the final measurement biased corrected an opposite amount to achieve performance equal to the same type of formation evaluation tool used outside of the drill string. For example, for an acoustic formation evaluation tool, the portion of the drill string that is configured to optimize the formation evaluation can have a material that has a slowness (driven by material's density and Young's modulus) that is offset from the slowness of the formation, allowing for return waves from the formation to be distinguished from waves returned from the drill string. Equally, the acoustic impedance can be optimized to optimize the energy transfer to and from the formation.

For formation evaluation tools using gamma rays or X-rays the portion of the drill string that is configured to optimize formation evaluation would be made from a material that has a low density, ensuring that the X-rays or gamma rays have minimum absorption from the material. Also the aperture can be optimized to direct a controlled beam of gamma rays or X-rays to and from the formation. For neutron based formation evaluation tools the portion of the drill string configured to optimize formation evaluation can be made from a material that has a low hydrogen content. In yet another example, for induction formation evaluation tools the portion of the drill string configured to optimize formation evaluation can be made from a material with a low electrical conductivity, and with an internal and external geometry preventing high concentration of currents near the transmitter.

Accordingly, the portion of the drill string optimized to enhance formation evaluation is configured to match required properties for the specific formation evaluation tool to be utilized adjacent that portion of the drill string. One skilled in the art with the aid of this disclosure would know how to configure portions of the drill string to optimize the formation evaluation.

In one or more embodiments, the evaluation tool string can be conveyed with a tether and the tether can be disconnected when landed in the drill string. The tool string can be configured to allow a tether to be attached thereto after landing to allow for the tool string to be retrieved.

The tool string can feature a power source (e.g. batteries), a memory system (e.g. using solid state non-volatile data storage chips), and closed-loop controls enabling autonomous, battery powered logging with data recorded in memory.

The portion of the drill string that is configured to optimize formation evaluation can include alloy steel or stainless steel or any metal pipes, collars, stabilizers, the like, or combinations thereof; composite collars with sections made of carbon fibers, aramids, glass, ceramics, epoxy, the like, or combinations thereof; features to help sensor on the evaluation tool acquire formation data; features to locate the evaluation tool string in the drill string; features to help uplink and downlink communication with surface; features to help the conveyance; features to make it more robust during the drilling phase.

In one or more embodiments, the drill string can have one or more portions for optimization of formation evaluation using an induction resistivity tools, and the optimized portions can include a collar that can have composite materials that are not electrically conductive, such as, epoxy fiberglass, or aramid epoxy-based materials. Furthermore, wear pads made of ceramics or any type of abrasion resistant material.

In one or more embodiments, the drill string can have one or more portions optimized for formation evaluation using acoustic tools, and the collar may use composite materials in which the acoustic velocity of the waves that propagate from the collar is different from the acoustic velocity of the waves that propagate from the formation. The different velocities allow the wave propagating from the formation to be distinguished from waves propagating from the collars. The collar may also use materials and manufacturing techniques enabling a consistent characterization and responses.

In one or more embodiments, the drill string can have one or more portions for optimization of formation evaluation using nuclear tools, the 'transparency' of the collar may be adjusted so that the emitted and received particles (photons, neutrons, . . . ) travel in an optimized, consistent media allowing for characterization of the measurement, and the beams of particles are directed in an optimized manner to the formation and back to the tool.

The drill string can have at least a no-go that engages with at least a feature on the tool string such as it locates the tool string along the drill string axis in the section of the drill pipe optimized for logging, such as all transmitters and receivers are located in an optimized manner. This can be made with a shoulder or an internal upset in the drill string, designed to be smaller than the tool string largest outer diameter until a certain length starting from the bottom, if located above the tool string, or with a diameter restriction if located at the bottom of the string.

Furthermore, the drill string can have equipment to provide radially centralizing, decentralizing, or offsetting of each tool of a known value in the collar such as the radial position of the tool is known and accounted for during processing. This can be achieved by molding, machining, appending inside features to the collar such as ribs, or the like.

Furthermore, the drill string can use drill pipes or collars available at the wellsite and accommodate for length variations (due to recuts or models) by modifying a parameter of the tool string such as adding or removing a spacer tool.

The drill string can also be optimized by adding or removing a collar on the drill string to accommodate for logging program requirements.

In one or more embodiments, an optimized portion of the drill string can have a no-go proximate thereto, the no-go can be configured to engage an upper portion of a tool string, and the tool string can have a first formation evaluation tool having a distance of x from the upper portion, e.g., nuclear tool, and a second formation evaluation tool having a distance y from the upper portion, e.g., acoustic tool. The no-go can be such that when the upper portion of the tool string is engaged with the no-go, the nuclear tool is located adjacent an optimized drill string portion configured to optimize nuclear formation evaluation and the acoustic tool is adjacent an optimized drill string portion for acoustic formation evaluations. Optimized drill sting portion can be a portion of the drill string that has a material with material properties that enable the formation evaluation tool next to it to perform as intended. For example if one of the formation evaluation tool is a Gamma Ray or X-ray tool the optimized drill string portion can have a material with a minimal density to allow for transparency of the X-rays or Gamma Rays through the portion of the drill string adjacent the formation evaluation tool, and if the second formation evaluation tool is a neutron formation evaluation tool the optimized drill string portion can be a material with a low hydrogen content, thereby, allowing suitable transparency through the optimized drill string portion.

The tool string can be configured to uplink and downlink communication with surface. In one embodiments, the tool string can have an internal feature of known and optimized shapes with the logging tool string comprising matching features to partially or fully restrict the annulus drilling fluid flow to a channel having a flow restriction modulated by the tool string and therefore enable mud pulse telemetry uplink and downlink.

In another embodiment, the drill string can have a non-electrically conductive collar and the tool string can electrically connect on both ends, enabling electromagnetic uplink telemetry.

In one or more embodiments, the drill string can be optimized to enhance conveyance for example the drill string can have a collar with a bore that has a landing apparatus located thereon. The landing apparatus may feature a deceleration system to lower down the deceleration level experienced by the tool string at landing.

In one or more embodiments, a response of an induction resistivity tool can be used to determine if the tool string is landed.

The drill string can be made robust to handle the forces exerted during the drilling phase. For example, the drill string can have wear bands on the outside of composite collars, coatings to prevent or slow down the hydrothermal ageing of the composites; or the like.

The method can also include operating the evaluation tool string to obtain formation evaluation data as the drill string is tripped out of hole; and sending acquired evaluation data to the surface using a communication system on the evaluation tool string.

The method can also include, acquiring operation data during conveyance, after landing, and during operation of the evaluation tool; and sending acquired evaluation data and acquired operation data to the surface using a communication system on the evaluation tool string as the drill string is tripped out of hole. The acquired operation data can be health data on the tool string, operational status of the components of the tool string, conveyance status, downhole pressure, temperature, or other wellbore condition data, or the like.

The evaluation tool string can include one or more nuclear measurement tools, one or more resistivity measurement tools, one or more dielectric measurement tools, one or more sonic measurement tools, one or more magnetic resonance measurement tools, one or more surveying measurement tools, or combinations thereof.

In one or more embodiments, the nuclear measurement tools obtain measurements comprising: natural gamma ray, spectral gamma ray, neutron porosity, lithodensity, neutron-gamma density, spectroscopy, X-ray density, pulsed neutron measurements, nuclear magnetic resonance, or combinations thereof.

In one or more embodiments, sonic and/or ultra-sonic measurement tools can obtain measurements comprising: borehole imaging, monopole, dipole, array sonic measurements, or combinations thereof.

In one or more embodiments, the surveying measurement tools comprise one or more gyroscopes, one or more accelerometers, one or more magnetometers, or combinations thereof.

In one or more embodiments, operating the evaluation tool string to obtain formation evaluation data as the drill string is tripped out of hole comprises operating a lithodensity measurement tool collimated for thru pipe logging. Traditional litho-density tools comprise a pad, with some mechanical degrees of freedom from the sonde body. The pad, applied onto the borehole wall houses a chemical radioactive source, and detectors (crystals and photomultiplier) and front-end electronics. The pad also contains shielding material aiming at controlling the emitted and incoming particle beams from the source and to the detectors, such as the emitted particles react with a controlled volume of the formation, and only a controlled portion of the resulting particles are sensed by the detectors. Unlike traditional litho-density where the pads are applied against the borehole wall, in the current embodiment the measurement tool will be in a collar, therefore the particle beams will have to travel through the collar and through drilling fluids before reaching the formation, the shape of the shielding material on the pad is therefore optimized to direct the beams particles beams to the formation and back to the detectors.

FIG. 1 depicts a schematic of a system for logging after drilling. The system included the drill string 110. The drill string 110 can be located in the wellbore after performing a drilling or clean up operation of the wellbore. The system also includes the evaluation tool string 120 disposed in the drill string 110 landed in an optimized portion 112 of drill string. The drill string also has a bottom hole assembly 114 connected therewith. The bottom hole assembly 114 can include MWD tools, LWD tools, RSS tools, a mud motor, a bit, the like, or combinations thereof.

Figure 2:
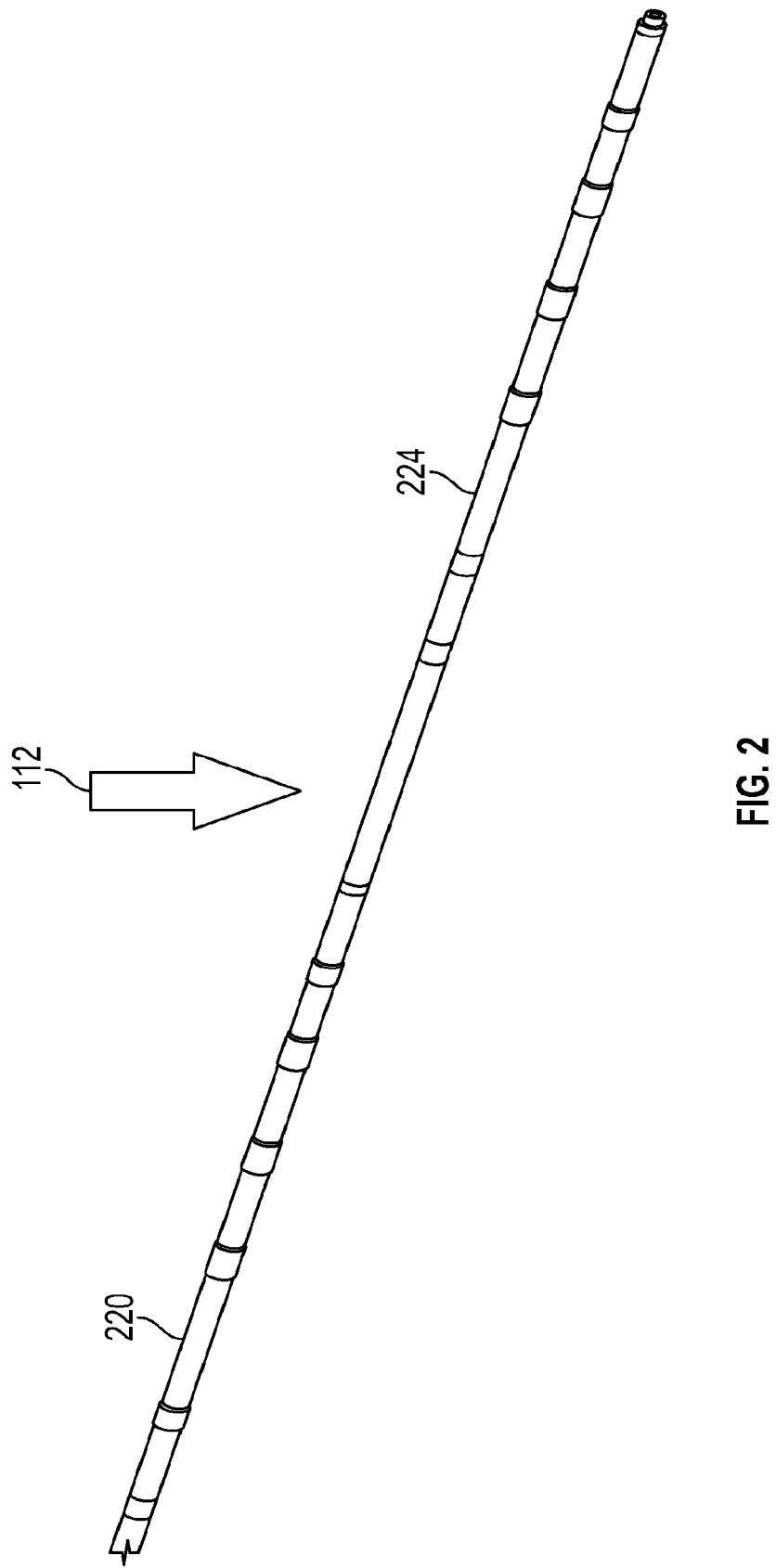
FIG. 2 depicts a schematic of an optimized portion of a drill string.

FIG. 2 depicts a schematic of an optimized portion of a drill string. The optimized portion 112 can include a first set of components 220. The components of the first set of components can be tubulars, drill collars, the like, or combinations thereof. The optimized portion 112 of drill string can also include a second set of components 224. The components in the second set of components can be tubulars, drill collars, the like, or combinations thereof. The first set of components and second set of components can include components made from composites, carbon fiber reinforced composites, fiber glass reinforced composites, alloys, or the like.

Figure 3:
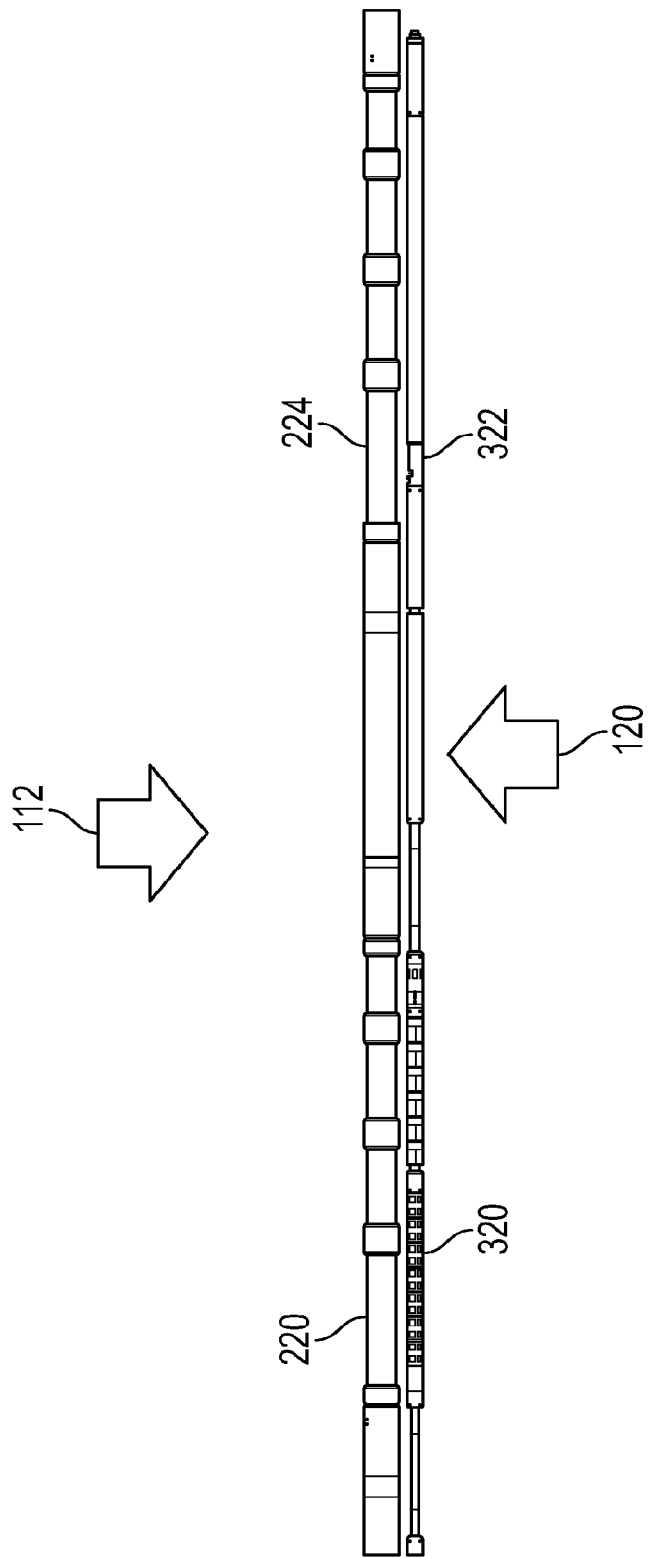
FIG. 3 depicts an example of an evaluation tool string adjacent the optimized portion depicting the alignment of the evaluation tool string with the optimized portion.

FIG. 3 depicts an example of an evaluation tool string adjacent the optimized portion depicting the alignment of the evaluation tool string with the optimized portion. The evaluation tool string 120 is shown adjacent the optimized portion 112 of the drill string, although shown adjacent for clarity, in operation the evaluation tool string would reside within the optimized portion 112 of the drill string. The evaluation tool string can have first series of sensors 320 and second set of sensors 322. The first series of sensors 320 can be adjacent the first set of components 220, and the first set of components can be arranged to optimize the ability of the sensors 320 to obtain evaluation data. The second series of sensors 322 can be adjacent the second set of components and the second set of components 224 can arranged to optimize the ability of the sensors 322 to obtain evaluation data.

Commonly, the drill string features: two composites collars, two standard drill pipes and a landing collar on top. The tool string can include one or more of a resistivity tool, a sonic tool, a litho-density tool, a neutron porosity tool, a spectral gamma ray tool, a natural gamma ray tool, a memory and battery system, a landing assembly seated on the landing collar, a mud pulse telemetry system, and a drag apparatus. In a second configuration the tool string can include one or more of a resistivity tool, a sonic tool, a litho-density tool, a neutron porosity tool, a pulsed-neutrons tool, a spectral gamma ray tool, a natural gamma ray tool, a memory and battery system, a landing assembly seated on the landing collar a mud pulse telemetry system, and a drag apparatus.

Although example assemblies, methods, systems have been described herein, the scope of coverage of this patent is not limited thereto. On the contrary, this patent covers every method, apparatus, and article of manufacture fairly falling within the scope of the appended claims either literally or under the doctrine of equivalents.

The invention claimed is:

1. A method of obtaining formation evaluation data comprising:
   deploying a tool string into, and moving the tool string internally through, a drill string removably located in a wellbore, wherein the drill string comprises a bottom hole assembly having a drill bit, and the tool string comprises a first measurement tool and a second measurement tool;
   landing the tool string in a portion of the drill string to position the first and second measurement tools of the tool string within respective first and second components of the portion of the drill string after moving the tool string internally through the drill string, wherein the tool string is removably coupled inside of the drill string, the first component comprises a first material configured to enable formation measurements by the first measurement tool through the first component to a formation outside of the drill string, and the second component comprises a second material configured to enable formation measurements by the second measurement tool through the second component to the formation outside of the drill string;

operating the tool string to obtain formation evaluation data comprising the formation measurements by the first and second measurement tools as the drill string is tripped out of hole;

acquiring operation data during conveyance, after landing, and during operation of the tool string; and sending the obtained formation evaluation data and the acquired operation data to surface equipment using a communication system on the tool string as the drill string is tripped out of the hole.

2. The method of claim 1, wherein deploying the tool string into the drill string comprises pumping the tool string into the drill string without a tether to the surface equipment.

3. The method of claim 1, wherein deploying the tool string into the drill string comprises pumping the tool string into the drill string with a tether connected with the tool string.

4. The method of claim 3, further comprising releasing the tether from the tool string after landing the tool string.

5. The method of claim 1, wherein at least one of the first measurement tool or the second measurement tool comprises one or more nuclear measurement tools, one or more resistivity measurement tools, one or more sonic measurement tools, one or more magnetic resonance measurement tools, one or more surveying measurement tools, or combinations thereof.

6. The method of claim 5, wherein the nuclear measurement tools obtain measurements comprising natural gamma ray, spectral gamma ray, neutron porosity, lithodensity, neutron-gamma density, spectroscopy, X-ray density, pulsed neutron measurements, nuclear magnetic resonance, or combinations thereof.

7. The method of claim 5, wherein the sonic measurement tools obtain measurements comprising borehole imaging, monopole, dipole, array sonic measurements, or combinations thereof.

8. The method of claim 5, wherein the surveying measurement tools comprise one or more gyroscopes, one or more accelerometers, one or more magnetometers, or combinations thereof.

9. The method of claim 5, wherein the tool string further comprises one or more ancillary or adapter head tools comprising one or more swivel, one or more centralizer, one or more universal joint, one or more excentralizer, one or more knuckle, one or more spacer, or combinations thereof.

10. The method of claim 1, wherein at least one of the first measurement tool or the second measurement tool comprises a litho-density measurement tool having a shielding material and a shielding pad, the shielding pad housing a chemical radioactive source and a detector, the chemical radioactive source being configured to emit a particle beam, the detector comprising a crystal and a photomultiplier, and the detector being configured to detect the particle beam from the chemical radioactive source.

11. A method of tethered deployment of a tool string in a drill string removably located in a wellbore, comprising:

landing the tool string, with a tether, in a portion of the drill string to position first and second measurement tools of the tool string within respective first and second components of the portion of the drill string after moving the tool string internally through the drill string, wherein the tool string is removably coupled inside of the drill string, the first component comprises a first material configured to enable formation measurements by the first measurement tool through the first component to a formation outside of the drill string, and the second component comprises a second material configured to enable formation measurements by the second measurement tool through the second component to the formation outside of the drill string; and logging formation evaluation data through the portion of the drill string comprising obtaining the formation measurements through the first and second components via the respective first and second measurement tools; wherein the tool string has a communication system configured to communicate to and from surface equipment after disconnection of the tether from the tool string.

12. The method of claim 11, wherein at least one of the first measurement tool or the second measurement tool comprises one or more nuclear measurement tools, one or more resistivity measurement tools, one or more sonic measurement tools, one or more magnetic resonance measurement tools, one or more surveying measurement tools, or combinations thereof.

13. The method of claim 11, wherein the communication system comprises a mud pressure telemetry, or an electromagnetic telemetry, or an ultrasonic distributed telemetry, or combinations thereof.

14. A method of untethered deployment of a tool string in a drill string removably located in a wellbore, comprising:

landing the tool string in a portion of the drill string to position first and second measurement tools of the tool string within respective first and second components of the portion of the drill string after moving the tool string internally through the drill string, wherein the tool string is removably coupled inside of the drill string, the first component comprises a first material configured to enable formation measurements by the first measurement tool through the first component to a formation outside of the drill string, and the second component comprises a second material configured to enable formation measurements by the second measurement tool through the second component to the formation outside of the drill string; and logging formation evaluation data through the portion of the drill string comprising obtaining the formation measurements through the first and second components via the respective first and second measurement tools, wherein the tool string comprises a communication system configured to communicate to and from surface equipment.

15. The method of claim 14, wherein at least one of the first measurement tool or the second measurement tool comprises one or more nuclear measurement tools, one or more resistivity measurement tools, one or more sonic measurement tools, one or more magnetic resonance measurement tools, one or more surveying measurement tools, or combinations thereof.

16. The method of claim 14, wherein the communication system comprises a mud pressure telemetry, or an electromagnetic telemetry, or an ultrasonic distributed telemetry, or combinations thereof.

17. The method of claim 1, wherein the first and second materials are different from one another.

18. The method of claim 1, wherein the first material and the second material comprises carbon fiber, aramid, glass, ceramic, epoxy, metal, or alloy.

19. The method of claim 1, wherein at least one of the first and second materials comprises a transparent material.

20. The method of claim 19, wherein a different one of the first and second materials comprises a composite material comprising carbon fiber, aramid, glass, ceramic, epoxy, metal, or alloy.

* * * * *